(12) United States Patent
Kaita et al.

(10) Patent No.: US 9,365,666 B2
(45) Date of Patent: *Jun. 14, 2016

(54) POLYMERIZATION CATALYST COMPOSITION, METHOD FOR PRODUCING SYNTHETIC POLYISOPRENE, AND SYNTHETIC POLYISOPRENE

(71) Applicant: BRIDGESTONE CORPORATION, Tokyo (JP)

(72) Inventors: Shojiro Kaita, Tokyo (JP); Satoru Tamaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/397,500

(22) PCT Filed: May 28, 2013

(86) PCT No.: PCT/JP2013/003367
§ 371 (c)(1),
(2) Date: Oct. 28, 2014

(87) PCT Pub. No.: WO2013/179651
PCT Pub. Date: Dec. 5, 2013

(65) Prior Publication Data
US 2015/0126695 A1 May 7, 2015

(30) Foreign Application Priority Data
May 30, 2012 (JP) ................................ 2012-123620

(51) Int. Cl.
C08F 36/06 (2006.01)
C08F 136/06 (2006.01)
C08F 36/08 (2006.01)
C08F 136/08 (2006.01)
C08F 4/52 (2006.01)
C08F 4/54 (2006.01)

(52) U.S. Cl.
CPC ............... *C08F 136/08* (2013.01); *C08F 4/54* (2013.01); *C08F 36/08* (2013.01)

(58) Field of Classification Search
CPC ............... C08F 4/52; C08F 4/54; C08F 4/545
See application file for complete search history.

(56) References Cited

U.S. PATENT DOCUMENTS

| 4,906,706 | A | * | 3/1990 | Hattori et al. | 525/343 |
|---|---|---|---|---|---|
| 7,956,141 | B2 | * | 6/2011 | Suzuki | C07F 5/00 502/162 |
| 2011/0263803 | A1 | * | 10/2011 | Suzuki et al. | 526/127 |
| 2012/0108773 | A1 | | 5/2012 | Wang et al. | |
| 2012/0123070 | A1 | | 5/2012 | Boisson et al. | |

FOREIGN PATENT DOCUMENTS

| CN | 102245647 A | 11/2011 |
|---|---|---|
| EP | 2599800 A1 | 6/2013 |
| EP | 2599802 A1 | 6/2013 |
| EP | 2599805 A1 | 6/2013 |
| JP | 11-255963 A | 9/1999 |
| JP | 2004-27179 A | 1/2004 |
| JP | 3813926 B2 | 8/2006 |
| JP | 2007-161918 A | 6/2007 |
| JP | 2007161918 A * | 6/2007 |
| JP | 2012-92335 A | 5/2012 |
| JP | 2012-131965 A | 7/2012 |
| RU | 2141486 C1 | 11/1999 |
| WO | 03033545 A2 | 4/2003 |
| WO | 2006/078021 A1 | 7/2006 |
| WO | 2010/074255 A1 | 7/2010 |
| WO | 2010/125072 A1 | 11/2010 |
| WO | 2012/014421 A1 | 2/2012 |
| WO | 2012/014455 A1 | 2/2012 |
| WO | 2012/014463 A1 | 2/2012 |

OTHER PUBLICATIONS

Machine translated English language equivalent of JP 2007-161918 (Jun. 2007, 8 pages).*
International Search Report for PCT/JP2013/003367 dated Aug. 6, 2013 English Translation.
Communication dated Aug. 4, 2015, issued by the Russian Patent Office in corresponding Russian Application No. 2014148789/04.
Communication dated Dec. 3, 2015, from the State Intellectual Property Office of People's Republic of China in counterpart application No. 201380028363.X.
Fischbach et al., "Structure-Reactivity Relationships in Rare-Earth Metal Carboxylate-Based Binary Ziegler-Type Catalysts", Organometallics, 2006, vol. 25, No. 7, pp. 1626-1642.

* cited by examiner

*Primary Examiner* — Brieann R Fink
(74) *Attorney, Agent, or Firm* — Sughrue Mion, PLLC

(57) ABSTRACT

A polymerization catalyst composition that, without accompanying excessive gelation, allows efficient synthesis of high molecular weight polyisoprene under industrial conditions is provided. The polymerization catalyst composition contains:

a rare earth element compound (component (A)) represented by the following general formula (i):

$$M\text{-}(NQ^1)(NQ^2)(NQ^3) \qquad (i);$$

at least one (component (B)) selected from an ionic compound and a halogen compound; and a compound (component (C)) represented by the following general formula (X):

$$YR^1_a R^2_b R^3_c \qquad (X).$$

5 Claims, No Drawings

POLYMERIZATION CATALYST COMPOSITION, METHOD FOR PRODUCING SYNTHETIC POLYISOPRENE, AND SYNTHETIC POLYISOPRENE

CROSS REFERENCE TO RELATED APPLICATIONS

This application is a National Stage of International Application No. PCT/JP2013/003367 filed May 28, 2013, claiming priority based on Japanese Patent Application No. 2013-123620 filed May 30, 2012, the contents of all of which are incorporated herein by reference in their entirety.

TECHNICAL FIELD

The present invention relates to a polymerization catalyst composition, a method of producing synthetic polyisoprene using the polymerization catalyst composition, and synthetic polyisoprene produced by the method.

BACKGROUND ART

In recent years, under social demands for energy conservation and resource conservation, the durability of a tire has been required, and thus rubber materials with excellent anti-fracture properties, abrasion resistance and anti-crack growth properties have been desired. Although natural rubber is known as rubber having excellent properties of those, due to soaring prices thereof it has been required to develop synthetic rubber having the durability similar to that of the natural rubber.

In order to make properties of the synthetic polyisoprene more similar to that of the natural rubber and thus to improve the durability, it has conventionally been performed to improve strain induced crystallization by synthetic polyisoprene having higher cis (For example, see Patent Documents 1 to 3). Although the durability of the synthetic polyisoprene has been thereby improved, since a large amount of catalyst is required to obtain a desired amount of the polyisoprene, there has been a problem that the synthetic polyisoprene contains a large amount of residual catalyst and thus the durability thereof under high severity conditions falls short of the durability of the natural rubber. Further, there has been a drawback that, in some technologies, use of halogen or aromatic solvents causes an extremely high environmental load during industrial production.

Also, it is known that, from polymers having an isoprene backbone, as compared with polymers made from other monomers, it is difficult to efficiently produce high molecular weight polymers. This is believed to be a factor of degradation of the durability under the high severity conditions.

RELATED ART DOCUMENTS

Patent Documents

Patent Document 1: Japanese Patent Application Laid-Open Publication No. 2004-27179
Patent Document 2: WO2006/078021
Patent Document 3: Japanese Patent No. 3813926

SUMMARY OF INVENTION

Technical Problem

As such, an object of the present invention is to provide a polymerization catalyst composition that allows efficient synthesis of high molecular weight polyisoprene under industrial conditions. Another object of the present invention is to provide a method of producing synthetic polyisoprene that, by using the polymerization catalyst composition, allows obtainment of a rubber composition which exhibits excellent durability under high severity conditions, and also to provide such synthetic polyisoprene.

Solution to Problem

A configuration of the present invention for achieving the above objects is as follows.

That is, a polymerization catalyst composition according to the present invention contains:
a rare earth element compound (component (A)) represented by the following general formula (i):

$$M\text{-}(NQ^1)(NQ^2)(NQ^3) \qquad (i)$$

(provided that M is at least one selected from lanthanide, scandium, and yttrium; and $NQ^1$, $NQ^2$, and $NQ^3$ are of amide group and may be either identical to or different from one another and have M-N binding);
at least one (component (B)) selected from an ionic compound and a halogen compound; and
a compound (component (C)) represented by the following general formula (X):

$$YR^1_a R^2_b R^3_c \qquad (X)$$

(provided that Y is metal selected from Group 1, Group 2, Group 12, and Group 13 of the periodic table; $R^1$ and $R^2$ are of a hydrocarbon group having 1 to 10 carbon atoms or a hydrogen atom; $R^3$ is of the hydrocarbon group having 1 to 10 carbon atoms; $R^1$, $R^2$, and $R^3$ may be identical to or different from one another; when Y is metal selected from Group 1 of the periodic table, a is 1 and b and c are 0; when Y is metal selected from Group 2 or Group 12 of the periodic table, a and b are 1 and c is 0; and when Y is metal selected from Group 13 of the periodic table, a, b, and C are all 1).

The use of such polymerization catalyst composition allows synthesis of high molecular weight polyisoprene. Further, the use of such polymerization catalyst composition allows obtainment of a rubber composition that exhibits excellent durability under high severity conditions.

Note that the "rare earth element" mentioned herein refers to a lanthanide element, scandium, or yttrium.

Also, a method of producing synthetic polyisoprene according to the present invention includes polymerization of isoprene monomer in the presence of a polymerization catalyst composition containing:
a rare earth element compound (component (A)) represented by the following general formula (i):

$$M\text{-}(NQ^1)(NQ^2)(NQ^3) \qquad (i)$$

(provided that M is at least one selected from lanthanide, scandium, and yttrium; and $NQ^1$, $NQ^2$, and $NQ^3$ are of amide group and may be either identical to or different from one another and have M-N binding);
at least one (component (B)) selected from an ionic compound and a halogen compound; and
a compound (component (C)) represented by the following general formula (X):

$$YR^1_a R^2_b R^3_c \qquad (X)$$

(provided that Y is metal selected from Group 1, Group 2, Group 12, and Group 13 of the periodic table; $R^1$ and $R^2$ are of a hydrocarbon group having 1 to 10 carbon atoms or a hydrogen atom; $R^3$ is of the hydrocarbon group having 1 to 10 carbon atoms; $R^1$, $R^2$, and $R^3$ may be identical to or different from one another; when Y is metal selected from Group 1 of the periodic table, a is 1 and b and c are 0; when Y is metal selected from Group 2 or Group 12 of the periodic table, a and b are 1 and c is 0; and when Y is metal selected from Group 13 of the periodic table, a, b, and C are all 1).

Synthesis of the isoprene monomer by using such catalyst composition containing the components (A) to (C) described above allows production of high molecular weight polyisoprene without excessive gelation. Accordingly, blending the polyisoprene with the rubber composition allows an improvement in durability of the rubber composition.

Note that the "synthetic polyisoprene" mentioned herein refers to a homopolymer of isoprene obtained by polymerization (synthesis) of isoprene as a monomer and includes a polymer with a part of polymer chains modified.

Effect of the Invention

According to the present invention, a polymerization catalyst composition that, without causing excessive gelation, allows efficient synthesis of high molecular weight polyisoprene under industrial conditions may be provided. Further, a method of producing synthetic polyisoprene that, by using the polymerization catalyst composition, allows obtainment of a rubber composition which exhibits excellent durability under high severity conditions and the synthetic polyisoprene may be provided.

DESCRIPTION OF EMBODIMENT (Synthetic Polyisoprene)
A polymer produced by using a polymerization catalyst composition according to the present invention is synthetic polyisoprene.
—Cis-1,4 Bond Content—
Although cis-1,4 bond content of the synthetic polyisoprene is not particularly limited and may be appropriately selected based on an intended purpose, it is preferably 95% or more, more preferably 97% or more, particularly preferably 98% or more.

When the cis-1,4 bond content is 95% or more, an orientation of a polymer chains is improved, leading to sufficient strain-induced crystallization. Further, when the cis-1,4 bond content is 98% or more, the strain-induced crystallization may become sufficient enough to obtain higher durability.
—Trans-1,4 Bond Content—
Although trans-1,4 bond content of the synthetic polyisoprene is not particularly limited and may be appropriately selected based on an intended purpose, it is preferably less than 5% or less, more preferably less than 3%, particularly preferably less than 1%.

When the trans-1,4 bond content is less than 5%, the strain-induced crystallization is less likely to be inhibited.
—3,4-Vinyl Bond Content—
—3,4-Vinyl Bond Content—
Although 3,4-vinyl bond content of the synthetic polyisoprene is not particularly limited and may be appropriately selected based on an intended purpose, it is preferably 5% or less, more preferably 3% or less, particularly preferably 1% or less.

When the 3,4-vinyl bond content is 5% or less, the strain-induced crystallization is less likely to be inhibited.
—Weight Average Molecular Weight (Mw)—
Weight average molecular weight of the polyisoprene (Mw) is preferably at least 1 million, more preferably at least 1.5 million.

—Number Average Molecular Weight (Mn)—
Number average molecular weight of the polyisoprene (Mn) is preferably at least 0.4 million, more preferably at least 0.5 million.
—Catalyst Residual Amount—
Catalyst residual amount in the polyisoprene is preferably 600 ppm or less, more preferably 200 ppm or less. When the catalyst residual amount is 600 ppm or less, the durability under the high severity conditions is improved. Note that the catalyst residual amount mentioned herein refers in particular to a measured amount of a rare earth element compound remaining in the polyisoprene.

(Method of Producing Synthetic Polyisoprene)
Next, a method that allows to produce the synthetic polyisoprene will be described in detail. Note that the method described in detail below is presented by way of example only.

The method of producing the synthetic polyisoprene includes at least a polymerization process and, further, a coupling process, a washing process, and other processes appropriately selected as necessary.
—Polymerization Process—
A polymerization process according to the present invention is a process to polymerize isoprene monomer.

The polymerization process, in the same manner as a usual method of producing a polymer by using a coordination ionic polymerization catalyst other than using the polymerization catalyst composition of the present invention, may polymerize isoprene as the monomer. The polymerization catalyst and the polymerization catalyst composition will be described in detail below.

As the polymerization method, any method such as a solution polymerization method, a suspension polymerization method, a liquid-phase bulk polymerization method, an emulsion polymerization method, a gas phase polymerization method, a solid phase polymerization method and the like may be used. Also, in using a solvent for a polymerization reaction, any inert solvent in the polymerization reaction may be used and such a solvent may be, for example, n-hexane, toluene, cyclohexane, and mixtures thereof. In particular, in light of an environmental impact, cost and the like, cyclohexane, n-hexane, and a mixture thereof may be suitably used. Further, cyclohexane may be particularly suitably used for its advantageous properties such as having a boiling point lower than that of toluene and low toxicity.

In the polymerization process, when using the polymerization catalyst composition, for example, (1) in a polymerization reaction system containing isoprene as the monomer, a component of the polymerization catalyst composition may be separately provided so as to obtain the polymerization catalyst composition in the reaction system, or (2) the polymerization catalyst composition prepared in advance may be provided to the polymerization reaction system.

In the polymerization process, also, a polymerization terminator such as methanol, ethanol, isopropanol and the like may be used to stop the polymerization.

In the polymerization process, the polymerization reaction of isoprene is carried out in an atmosphere of an inert gas, preferably nitrogen gas or argon gas. Polymerization temperature of the polymerization reaction is not particularly limited but may be, for example, preferably within a range of −100° C. to 200° C., or about at room temperature. Note that raising the polymerization temperature may cause a reduction in cis-1,4 selectivity in the polymerization reaction. Also, pressure of the polymerization reaction, in order to take sufficient amount of isoprene into the polymerization reaction system, is preferably within a range of 0.1 to 10.0 MPa.

Further, a reaction time of the polymerization reaction is not particularly limited but is, for example, preferably within a range from 1 second to 10 days. However, the reaction time may be appropriately selected based on conditions such as a type of the catalyst, the polymerization temperature and the like.

—Polymerization Catalyst Composition—

Next, the polymerization catalyst composition of the present invention will be described.

A catalytic activity of the polymerization catalyst composition of the present invention is preferably 30 kg/mol·h or more, more preferably 1000 kg/mol·h or more. When the catalytic activity is 30 kg/mol·h or more, polyisoprene may be efficiently synthesized. Note that a value of the catalytic activity mentioned herein refers to an ability to produce polyisoprene per catalytic unit mol per unit time.

The polymerization catalyst composition contains at least:

a rare earth element compound (component (A)) represented by the following general formula (i):

$$M\text{-}(NQ^1)(NQ^2)(NQ^3) \quad (i)$$

(provided that M is at least one selected from lanthanide, scandium, and yttrium; and $NQ^1$, $NQ^2$, and $NQ^3$ are of amide group and may be either identical to or different from one another and have M-N binding);

at least one (component (B)) selected from an ionic compound (B-1) and a halogen compound (B-3); and a compound (component (C)) represented by the following general formula (X):

$$YR^1_a R^2_b R^3_c \quad (X)$$

(provided that Y is metal selected from Group 1, Group 2, Group 12, and Group 13 of the periodic table; $R^1$ and $R^2$ are of a hydrocarbon group having 1 to 10 carbon atoms or a hydrogen atom; $R^3$ is of the hydrocarbon group having 1 to 10 carbon atoms; $R^1$, $R^2$, and $R^3$ may be identical to or different from one another; when Y is metal selected from Group 1 of the periodic table, a is 1 and b and c are 0; when Y is metal selected from Group 2 or Group 12 of the periodic table, a and b are 1 and c is 0; and when Y is metal selected from Group 13 of the periodic table, a, b, and C are all 1).

The component (A) is the rare earth element compound or a reaction product of the rare earth element compound and a Lewis base and includes a reaction product having no bond between the rare earth element and carbon.

The aforementioned (B-1) includes an ionic compound composed of non-coordinating anion and cation.

The aforementioned (B-3) includes at least one of Lewis acid, a complex compound of metal halide and the Lewis base, and an organic compound containing active halogen.

Also, aluminoxane (B-2) may be further included.

Further, a compound (component (D)) that may be an anionic ligand may also be included.

In the above formula (i), the amide group represented by NQ may be any one of an aliphatic amide group such as a dimethylamide group, a diethylamide group, and a diisopropyl amide group; a phenylamide group, a 2,6-di-tert-butylphenyl amide group, a 2,6-diisopropylphenyl amide group, a 2,6-dineopentilphenyl amide group, a 2-tert-butyl-6-isopropyphenyl amide group, a 2-tert-butyl-6-neopentilphenyl amide group, and a 2-isopropyl-6-neopentilphenyl amide group; an arylamide group such as a 2,4,6-tert-butylphenyl amide group; and a bis-trialkyl silylamide group such as a bis-trimethyl silylamide group. Among them, the bis-trimethylsilyl amide group is preferable.

Note that, in the polymerization reaction system, a molar amount of the component (A) of the polymerization catalyst composition, relative to isoprene monomer that is added later, is no more than 1/5000, particularly preferably no more than 1/10000. A specific concentration is preferably within a range of 0.1 to 0.0001 mol/l. Specifying a molar ratio as described above allows improvement in cis-1,4 bond content and also in the catalytic activity, thereby significantly reducing the catalyst residual amount in the synthetic polyisoprene. Therefore, blending the synthetic polyisoprene with the rubber composition may further improve the durability of the rubber composition.

The component (A) used for the polymerization reaction system described above is the rare earth element compound or a reaction product of the rare earth element compound and the Lewis base. Here, both the rare earth element compound and the reaction product of the rare earth element compound and the Lewis base preferably have no binding between the rare earth element and carbon. When the rare earth element compound and the reaction product have no binding between the rare earth element and carbon, an obtained compound is stable and easy to handle. Here, the rare earth compound refers to a compound containing lanthanoid composed of elements with atomic numbers from 57 to 71 of the periodic table, or scandium, or yttrium.

Concrete examples of the lanthanoid may include lanthanum, cerium, praseodymium, neodymium, promethium, samarium, europium, gadolinium, terbium, dysprosium, holmium, erbium, thulium, ytterbium, and lutetium. Note that the aforementioned component (A) may be used alone or in combination with one or more different types thereof.

In the component (A) used in the polymerization catalyst composition, the Lewis base to react with the rare earth element compound may be, for example, tetrahydrofuran, diethyl ether, dimethyl aniline, trimethyl phosphine, lithium chloride, neutral olefin, neutral diolefin and the like.

The component (B) used in the polymerization catalyst composition is at least one compound selected from a group composed of the ionic compound (B-1) and the halogen compound (B-3). From the viewpoint of environmental consideration, the ionic compound (B-1) may be preferably used as compared with the halogen compound (B-3).

As the ionic compound represented by (B-1) as described above may be an ionic compound and the like that includes non-coordinating anion and cation and is capable of forming a cationic transition metal compound through reaction with the rare earth element compound or with the reaction product of the rare earth element compound and the Lewis base as the above component (A) may be mentioned. Here, the non-coordinating anion may be tetravalent boron anion such as tetraphenylborate, tetrakis(monofluorophenyl)borate, tetrakis(difluorophenyl)borate, tetrakis(trifluoromethyl)borate, tetrakis(tetrafluorophenyl)borate, tetrakis(pentafluorophenyl) borate, tetrakis(tetrafluoromethylphenyl)borate, tetra(tolyl) borate, tetra(xylyl)borate, (triphenyl, pentafluorophenyl) borate, [tris(pentafluorophenyl), phenyl]borate, tridecahydride-7,8-dicarbaundecaborate and the like. Among them, tetrakis(pentafluorophenyl) borate is preferable. As the cation, on the other hand, carbonium cation, oxonium cation, ammonium cation, phosphonium cation, cycloheptatrienyl cation, ferrocenium cation having transition metal may be mentioned. Concrete examples of the carbonium cation may include trisubstituted carbonium cation such as triphenyl carbonium cation, tri (substituted phenyl) carbonium cation and the like. Concrete examples of the tri (substituted phenyl) carbonium cation may include tri(methylphenyl) carbonium cation, tri(dimethylphenyl) carbonium cation and the like. Concrete examples of the ammonium cation may include trialkyl ammonium cation such as trimethyl ammonium cation, triethyl ammonium cation, tripropyl ammonium cation, and tributyl ammonium cation (e.g., tri(n-butyl) ammonium cation); N,N-dialkyl anilinium cation such as N,N-dimethyl anilinium cation, N,N-diethyl anilinium cation, N,N-2,4,6-pentamethyl anilinium cation and the like; and dialkyl ammonium cation such as diisopropyl ammonium cation, dicyclohexyl ammonium cation and the like. Concrete examples of the phosphonium cation may include triarylphosphonium cation such as triphenylphosphonium cation, tri(methylphenyl)phosphonium cation, tri(dimethylphenyl)phosphonium cation and the like. Therefore, the ionic compound is preferably a compound composed of ones selected from each of non-coordinating anions and the cations described above and, in particular, N,N-dimethyl anilinium tetrakis(pentafluorophenyl)borate, triphenyl carbonium tetrakis(pentafluorophenyl) borate and the like are preferable. These ionic compound may be used alone, or in combination with one or more different ionic compounds. Note that a molar quantity of the ionic compound content of the polymerization catalyst composition described above is preferably 0.1 to 10 times relative to the component (A), more preferably approximately 1 time.

Aluminoxane represented by (B-2) as described above is a compound obtained by bringing an organoaluminum compound and a condensing agent into contact with each other and may be, for example, chain aluminoxane or cyclic aluminoxane having a repeating unit expressed by a general formula: (—Al(R')O—) (provided that R' represents the hydrocarbon group having 1 to 10 carbon atoms, some of which may be substituted with a halogen atom and/or an alkoxy group, and a degree of polymerization of the repeating unit is preferably no less than 5, more preferably no less than 10). Here, specific examples of the R' include a methyl group, an ethyl group, a propyl group, an isobutyl group and the like, among which the methyl group is preferable. Further, as the organoaluminum compound used as a raw material of aluminoxane, for example, trialkyl aluminum such as trimethyl aluminum, triethyl aluminum, and tri-isobutyl aluminum, and a mixture thereof may be mentioned, among which the trimethyl aluminum is particularly preferable. For example, aluminoxane using a mixture of trimethyl aluminum and tri-butyl aluminum as the raw material may be preferably used. Note that aluminoxane content of the polymerization catalyst composition described above is preferably adjusted such that an element ratio of the rare earth element M forming the component (A) to the aluminum element Al of the aluminoxane, i.e., the element ratio Al/M satisfies approximately 10 to 1000.

The halogen compound expressed by the formula (B-3) as described above includes at least one of Lewis acids and an organic compound containing a complex compound of metal halides and the Lewis base and an active halogen and may react with the rare earth element compound or the reaction product of the rare earth element compound and the Lewis base serving as the above component (A), thereby generating a cationic transition metal compound, a halogenated transition metal compound, and a compound with a transition metal center having insufficient electric charge. Especially in consideration of stability in the air, as the halogenated compound of (B-3), the complex compound of the metal halide and the Lewis base may be preferably used as compared with Lewis acid. Further, as the halogen compound, a compound having two or more halogen atom, as compared with a compound having only one halogen atom, has better reactivity and allows a reduction in an amount thereof to be used, and thus is more preferable.

Note that a molar amount of a total halogen compound content of the polymerization catalyst composition described above is preferably 1 to 5 times relative to the (A) component.

As the Lewis acid mentioned above, in addition to a boron-containing halogenated compound such as $B(C_6F_5)_3$, an aluminum-containing halogen compound such as $Al(C_6F_5)_3$ and the like, a halogen compound containing an element of Groups III, IV, V, VI or VIII may be used. Preferably, aluminum halides and organometallic halides are mentioned. As the halogen, chlorine or bromine is preferable. Concrete examples of the Lewis acid may include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, dibutyl tin dichloride, aluminum tribromide, antimony trichloride, antimony pentachloride, phosphorus trichloride, phosphorus pentachloride, tin tetrachloride, titanium tetrachloride, tungsten hexachloride and the like. Among them, diethyl aluminum chloride, ethyl aluminum sesquichloride, ethyl aluminum dichloride, diethyl aluminum bromide, ethyl aluminum sesquibromide, and ethyl aluminum dichloride bromide are particularly preferable.

The metal halide forming the complex compound of the metal halide and the Lewis base described above may be beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide and the like. Among them, magnesium chloride, calcium chloride, barium chloride, manganese chloride, zinc chloride, and copper chloride are preferable, and magnesium chloride, manganese chloride, zinc chloride, and copper chloride are particularly preferable.

Further, as the Lewis base forming the complex compound of the metal halide and the Lewis base, a phosphorus compound, a carbonyl compound, a nitrogen compound, an ether compound, alcohols and the like are preferable. In particular, tributyl phosphate, tri-2-ethylhexyl phosphoric acid, triphenyl phosphoric acid, tricresyl phosphoric acid, triethylphosphine, tributylphosphine, triphenylphosphine, diethylphosphino ethane, diphenylphosphino ethane, acetylacetone, benzoylacetone, propionitrile acetone, valerylacetone acetone, ethyl acetylacetone, methyl acetoacetate, ethyl acetoacetate, phenyl acetoacetate, malonate dimethyl, malonate diethyl, malonate diphenyl, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol and the like may be mentioned. Among them, tri-2-ethylhexyl phosphoric acid, tricresyl phosphoric acid, acetylacetone, 2-ethylhexane acid, versatic acid, 2-ethylhexyl alcohol, 1-decanol, and lauryl alcohol are preferable.

The Lewis base mentioned above is brought to reaction at a ratio of 0.01 to 30 mol, preferably 0.5 to 10 mol per mole of the metal halide mentioned above. A reaction product with the Lewis base at this ratio allows a reduction in metal remaining in the polymer.

Organic compounds containing the active halogen described above may be benzyl chloride and the like.

Preferably, the component (C) used for the polymerization catalyst composition described above is an organometallic compound expressed by the following general formula (X):

$$YR^1_a R^2_b R^3_c \quad (X)$$

(provided that Y represents metal selected from Groups 1, 2, 12, and 13 of the periodic table; $R^1$ and $R^2$ may be either identical to or different from each other and the hydrocarbon group having 1 to 10 carbon atoms or a hydrogen atom; $R^3$ is the hydrocarbon group having 1 to 10 carbon atoms and may be either identical to or different from the above $R^1$ and $R^2$; when Y is a metal selected from the Group 1 of the periodic table, a is 1 and b and c are 0; when Y is a metal selected from the Groups 2 or 12 of the periodic table, a and b are 1 and c is 0; and when Y is a metal selected from the Group 13 of the periodic table, a, b, and c are all 1), and an organoaluminum composition expressed by the following general formula (Xa):

$$Al^1 R^2 R^3 \quad (Xa)$$

(provided that $R^1$ and $R^2$ are either identical to or different from each other and the hydrocarbon group having 1 to 10 carbon atoms or the hydrogen atom; and $R^3$ is the hydrocarbon group having 1 to 10 carbon atoms and may be either identical to or different from the above $R^1$ and $R^2$). The organoaluminum composition expressed by the general formula (Xa) may be trimethylaluminum, triethylaluminum, tri-n-propyl aluminum, tri-isopropyl aluminum, tri-n-butyl aluminum, tri-isobutyl aluminum, tri-t-butyl aluminum, tripentyl aluminum, tri-hexyl aluminum, tricyclohexyl aluminum, tri-octyl aluminum; diethyl aluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, di-iso-octyl aluminum hydride; ethyl aluminum dihydride, n-propyl aluminum dihydride, isobutyl aluminum dihydride and the like. Among them, triethyl aluminum, tri-isobutyl aluminum, diethyl aluminum hydride, and diisobutyl aluminum hydride are preferable. The organioaluminum compounds described above as the component (C) may be used alone or in combination with one or more thereof. The molar amount of the component (C) content of the polymerization catalyst composition described above is preferably at least 10 times with respect to the component (A), more preferably 20 to 1000 times. Also, the molar amount of the component (C) is preferably at least 1/5000 of a molar amount of isoprene monomer to be added later, particularly preferably 1/3000 to 1/10. The molar ratio as defined above allows an improvement in cis-1,4 bond content as well as the catalytic activity, thereby significantly reducing an amount of residual catalyst in the synthetic polyisoprene. Thus, blending such polyisoprene in the rubber composition allows a further improvement in the durability of the rubber composition.

—Compound that May be Anionic Ligand—

A compound that may be the anionic ligand (component (D)) is not particularly limited as long as it may be replaced with the amide group of component (A) but preferably has any one of an OH group, an NH group, and an SH group.

Specifically, the compounds having the OH group may be aliphatic alcohol, aromatic alcohol and the like. In particular, dibutyl hydroxytoluene, alkylated phenol, 4,4'-thiobis-(6-t-butyl-3-methylphenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol), 2,6-di-t-4-ethylphenol, 1,1,3-tris-(2-methyl-4-hydroxy-5-t-butylphenyl) butane, n-octadecyl-3-(4-hydroxy-3,5-di-t-butylphenyl) propionate, tetrakis[methylene-3-(3,5-di-t-butyl-4-hydroxyphenyl) propionate]methane, dilaurylthiodipropionate, distearylthiodipropionate, and dimillistyryl propionate may be mentioned but not limited thereto. A hindered phenol-based compound may include, for example, triethylene glycol-bis [3-(3-t-butyl-5-methyl-4-hydroxyphenyl) propionate], 1,6-hexanediol-bis[3-(3,5-di-t-butyl-4-hydroxyphenyl) propionate], 2,4-bis-(n-octylthio)-6-(4-hydroxy-3,5-di-t-butyl anilino)-1,3,5-triazine, pentaerythril-tetrakis[3-(3,5-di-t-butyl-4-hydroxyphenyl) propionate], 2,2-thio-diethylene-bis [3-(3,5-di-t-butyl-4-hydroxyphenyl) propionate], octadecyl-3-(3,5-di-t-butyl-4-hydroxyphenyl) propionate, N,N'-hexamethylene bis(3,5-di-t-butyl-4-hydroxy-hydrocinnamamide), 3,5-t-butyl-4-hydroxybenzyl phosphonate-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, octyl diphenylamine, and 2,4-bis[(octylthio)methyl]o-cresol.

Further, a hydrazine compound may be N,N'-bis[3-(3,5-di-t-butyl-4-hydroxyphenyl)propionyl]hydrazine.

The compounds having the NH group may be primary amines such as alkyl amine, aryl amine and the like, or secondary amines. In particular, dimethylamine, diethylamine, pyrrole, ethanolamine, diethanolamine, dicyclohexylamine, N,N'-dibenzylethylenediamine, and bis(2-diphenylphosphino phenyl) amine may be mentioned.

The compounds having the SH group may be, in addition to aliphatic thiol, aromatic thiol and the like, those represented by the following general formulas (I) and (II).

[Chemical formula 1]

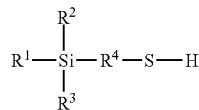

(I)

(provided that each of $R^1$, $R^2$, and $R^3$ are independently represented by $-O-C_jH_{2j+1}$, $-(O-C_kH_{2k}-)_a-O-C_mH_{2m+1}$, and $-C_nH_{2n+1}$; at least one of $R^1$, $R^2$, and $R^3$ is represented by $-(O-C_kH_{2k}-)_a-O-C_mH_{2m+1}$; each of j, m, and n is independently between 0 and 12; each of k and a is independently between 1 and 12; and $R^4$ is a C1-12 linear, branched or cyclic, saturated or unsaturated, alkylene group, cycloalkylene group, cycloalkylalkylene group, cycloalkenyl alkylene group, alkenylene group, cycloalkenylene group, cycloalkyl alkenylene group, cycloalkenyl alkenylene group, arylene group, or aralkylene group.)

Specific examples of those represented by the general formula (I) may include 3-mercaptopropyltrimethoxysilane, 3-mercaptopropyltriethoxysilane, 3-mercaptopropylmethyldimethoxysilane, (mercaptomethyl) dimethylethoxysilane, (mercaptomethyl) dimethylethoxysilane, and mercaptomethyl trimethoxysilane.

[Chemical formula 2]

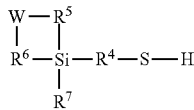

(provided that W is represented by —NR$^8$—, —O—, or —CR$^9$R$^{10}$— (here, R$^8$ and R$^9$ are C$_p$H$_{2p+1}$, R$^{10}$ is —C$_q$H$_{2q+1}$, and each of p and q is between 0 and 20); each of R$^5$ and R$^6$ is independently represented by -M-C$_r$H$_{2r}$— (here, M is —O— or —CH$_2$—, and r is between 1 and 20); R$^7$ is represented by —O—C$_j$H$_{2j+1}$, —(O—C$_k$H$_{2k}$—)$_a$—O—C$_m$H$_{2m+1}$, or —C$_n$H$_{2n+1}$; each of j, m and n is between 0 and 12; each of k and a is between 1 and 12; and R$^4$ is the C1-12 linear, branched or cyclic, saturated or unsaturated, alkylene group, cycloalkylene group, cycloalkylalkylene group, cycloalkenyl alkylene group, alkenylene group, cycloalkenylene group, cycloalkyl alkenylene group, cycloalkenyl alkenylene group, arylene group, or aralkylene group.)

Specific examples of those represented by the general formula (II) may include 3-mercaptopropyl(ethoxy)-1,3-dioxa-6-methylaza-2-silacyclooctane, 3-mercaptopropyl(ethoxy)-1,3-dioxa-6-buthylaza-2-silacyclooctane, and 3-mercaptopropyl(ethoxy)-1,3-dioxa-6-dodecylaza-2-silacyclooctane.

As the component (D), anionic tridentate ligand precursor represented by the following general formula (ii) may be preferably used:

(provided that R represents an anionic electron donor group including a coordinating atom selected from Group 15 atoms; each of E$^1$ and E$^2$ independently represents a neutral electron donor group including a coordinating atom selected from Group 16 atoms and Group 15 atoms; and each of T$^1$ and T$^2$ represents a crosslinking group for crosslinking X, E$^1$, and $^-$E$^2$.)

Preferably, the component (D) in an amount of 0.01 to 10 mol, particularly preferably 0.1 to 1.2 mol is added relative to 1 mol of the rare earth element compound ((A) component). When the adding amount is 0.1 mol or more, the catalyst activity is sufficiently high, allowing efficient synthesis of polyisoprene. Although the adding amount preferably corresponds to the amount of the rare earth element compound (1.0 mol), the adding amount may be more. However, the adding amount greater than 1.2 mol is not preferable as it increases loss of a reagent.

In the above general formula (ii), the electron donating groups E$^1$ and E$^2$ include a coordination atom selected from Group 16 and Group 15. Also, E$^1$ and $^-$E$^2$ may be either the same group or different groups. The coordinating atom may be, for example, nitrogen N, phosphorus P, oxygen O, or sulfur S, and preferably P.

When the coordination atom contained in E$^1$ and E$^2$ is P, the neutral electron donating group E$^1$ or E$^2$ may be, for example, 1) a diarylphosphino group such as a diphenylphosphino group and a ditolylphosphino group, 2) dialkylphsphino group such as a dimethylphosphino group and a diethylphosphino group, or 3) alkylarylphosphino group such as methyl phenyl phosphino group, and more preferably the diarylphosphino group.

When the coordination atom included in E$^1$ and E$^2$ is N, the neutral electron donating group E$^1$ or E$^2$ may be, for example, 1) a dialkylamino group such as a dimethylamino group, a diethylamino group, and a bis(trimethylsilyl) amino group, 2) a diarylamino group such as a diphenylamino group, or 3) an alkylaryl amino group such as a methylphenyl group.

When the coordination atom included in E$^1$ and E$^2$ is O, the neutral electron donating group E$^1$ or E$^2$ may be, for example, 1) an alkoxy group such as a methoxy group, an ethoxy group, a propoxy group, and a butoxy group, or 2) an aryloxy group such as a phenoxy group and 2,6-dimethyl phenoxy group.

When the coordination atom included in E$^1$ and E$^2$ is S, the neutral electron donating group E$^1$ or E$^2$ may be, for example, 1) an alkylthio group such as a methylthio group, an ethylthio group, a propylthio group, and a butylthio group, or 2) an arylthio group such as a phenylthio group and a tolylthio group.

The anionic electron donating group X is a group including a coordination atom selected from Group 15. As the coordination atom, phosphorus P and nitrogen N are preferable, and N is more preferable.

The crosslinking group T$^1$ and T$^2$ are required only to crosslink X and E$^1$, and X and E$^2$ and may be, for example, an arylene group which may have a substituent group on an aryl ring. Also, T$^1$ and T$^2$ may be either the same group or different groups.

The arylene group may be a phenylene group, a naphthylene group, a pyridilene group, and a thienylene group (preferably, the phenylene group or the naphthylene group). Further, any group may be substituted on the aryl ring of the arylene group. Examples of the substituent group may include an alkyl group such as a methyl group and an ethyl group, an aryl group such as a phenyl group and a tolyl group, a halogen group such as fluoro, chloro, and bromo, and a silyl group such as trimethylsilyl group.

More preferably, the arylene group is 1,2-phenylene group, for example.

The anionic tridentate ligand precursor of metal complex forming the polymerization catalyst composition may be preferably, for example, those represented by the general formula (iii) presented below. Those may be prepared by referring to, for example, a method of the embodiment described below or a method described in Organometallics, 23, p 47784787 (2004).

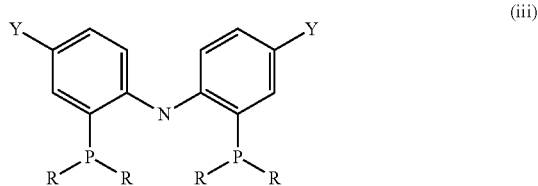

(provided that R represents an alkyl group or an aryl group, Y represents a hydrogen, an alkyl group, a halogeno group, or a silyl group)

In particular, a PNP ligand such as bis(2-diphenylphosphinophenyl) amine and the like may be mentioned.

(Rubber Composition)

The rubber composition contains at least rubber component and, if necessary, a filler, a crosslinking agent, and other components.

—Rubber Component—

The rubber component contains at least synthetic polyisoprene MADE by the manufacturing method of the present invention and, if necessary, other rubber components.

The synthetic polyisoprene amount (content) of the rubber component is not particularly limited but may be appropriately selected according to an intended purpose, and preferably 15 mass % to 100 mass %.

When the amount of the synthetic polyisoprene in the rubber component is more than 15 mass %, the effect of the synthetic polyisoprene may be fully exerted.

—Other Rubber Component—

The other rubber components are not particularly limited but may be appropriately selected according to an intended purpose, and may be, for example, butadiene rubber (BR), styrene-butadiene rubber (SBR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluorine rubber, urethane rubber, or isoprene copolymers. Those rubber components may be used alone or in combination with one or more of them.

—Filler—

The fillers are not particularly limited but may be appropriately selected according to an intended purpose, and may be, for example, carbon black and inorganic fillers. Preferably, the filler is at least one selected from carbon black and the inorganic filler. Here, more preferably, the rubber composition contains carbon black. Note that the filler is blended with the rubber composition in order to improve reinforcing properties and the like.

The filler amount (content) is not particularly limited but may be selected according to an intended purpose, and preferably, with respect to 100 parts by mass of the rubber component, 10 parts by mass to 100 parts by mass, more preferably 20 parts by mass to 80 parts by mass, particularly preferably 30 parts by mass to 60 parts by mass.

When the amount of the filler is 10 parts by mass or more, the effect of adding the filler may be observed and, when the amount is 100 parts by mass or less, the filler may be mixed in the rubber component, thereby improving performance of the rubber composition.

On the other hand, when the amount of the filler is within the preferable range or the particularly preferable range described above, it is advantageous in terms of balancing workability, a low loss factor, and durability.

—Carbon Black—

The carbon black is not particularly limited but may be appropriately selected according to an intended purpose, and may be, for example, FEF, GPF, SRF, HAF, N339, IISAF, ISAF, and SAF. The carbon black may be used alone or in combination with one or more of them.

A nitrogen adsorption specific surface area of the carbon black (measured in accordance with $N_2SA$, JIS K 6217-2: 2001) is not particularly limited but may be appropriately selected according to an intended purpose, and preferably 20 $m^2/g$ to 100 $m^2/g$, more preferably 35 $m^2/g$ to 80 $m^2/g$.

When the nitrogen adsorption specific surface area of the carbon black ($N_2SA$) is smaller than 20 $m^2/g$, the obtained rubber has low durability, possibly hindering obtainment of sufficient crack growth resistance. When the nitrogen adsorption specific surface area of the carbon black ($N_2SA$) exceeds 100 $m^2/g$, the low loss factor decreases, possibly causing poor workability.

The carbon black content relative to 100 parts by mass of the rubber component is not particularly limited but may be appropriately selected according to an intended purpose, and preferably 10 parts by mass to 100 parts by mass, more preferably 10 parts by mass to 70 parts by mass, particularly preferably 20 parts by mass to 60 parts by mass.

When the carbon black content is less than 10 parts by mass, fracture resistance may deteriorate due to insufficient reinforcing property. When the carbon black content exceeds 100 parts by mass, the workability and the low loss factor may be deteriorated.

On the other hand, when the carbon black content is within the more preferable range, it is advantageous in terms of balancing each of the properties.

—Inorganic Filler—

The inorganic filler is not particularly limited but may be appropriately selected according to an intended purpose, and may be, for example, silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, barium sulfate or the like. Those inorganic fillers may be used alone or in combination with one or more of them.

In using the inorganic filler, also, a silane coupling agent may be used appropriately.

—Crosslinking Agent—

The crosslinking agent is not particularly limited but may be appropriately selected according to an intended purpose, and may be, for example, a sulfur-based crosslinking agent, an organic peroxide crosslinking agent, an inorganic crosslinking agent, a polyamine crosslinking agent, a resin crosslinking agent, a sulfur compound-based crosslinking agent, an oxime-nitrosamine-based crosslinking agent or the like. Among them, the sulfur-based crosslinking agent is more preferable for the rubber composition for a tire.

The crosslinking agent content is not particularly limited but may be appropriately selected according to an intended purpose, and may be preferably, with respect to 100 parts by mass of the rubber component, 0.1 parts by mass to 20 parts by mass.

When the crosslinking agent content is less than 0.1 parts by mass, the crosslinking may hardly proceed. When the crosslinking agent content exceeds 20 parts by mass, the crosslinking is likely to proceed by some crosslinking agents during kneading, and physical properties of vulcanizates may be impaired.

—Other Components—

The rubber composition may also be combined with a vulcanization accelerator, which may be a guanidine based, an aldehyde-amine based, an aldehyde-ammonia based, a thiazole based, a sulfonamide based, a thiourea based, a thiuram based, a dithiocarbamate based, or a xanthate based compound.

Further, as necessary, softening agents, vulcanizing agents, colorants, flame retardants, lubricants, foaming agents, plasticizers, processing aids, antioxidants, anti-aging agents, scorch retarders, ultraviolet inhibitors, antistatic agents, coloration inhibitors, and other known compounding agents may be used according to an intended use.

(Crosslinked Rubber Composition)

The rubber composition may be crosslinked and used as a crosslinked rubber composition. The crosslinked rubber composition is not limited as long as being obtained by crosslinking the rubber composition and may be appropriately selected according to an intended purpose.

Crosslinking conditions are not particularly limited but may be appropriately selected according to an intended purpose, and preferably include temperature of 120° C. to 200° C. and a heating time of 1 to 900 minutes.

(Tire)

As long as using the rubber composition or the crosslinked rubber composition described above, the tire is not particularly limited but may be appropriately selected according to an intended purpose.

An application site of the rubber composition or the crosslinked rubber composition described above is not particularly limited but may be appropriately selected according to an intended purpose, and may be, for example, a tread, a base tread, a sidewall, side reinforcing rubber, a bead filler or the like.

Among these, the tread is advantageous as the application site, in terms of durability.

As a method of manufacturing the tire, conventional methods may be employed. For example, on a tire forming drum, materials usually used for producing a normal tire such as a carcass layer formed of unvulcanized rubber and/or a code, a belt layer, a tread layer and the like are sequentially bonded to one another, and then the drum is removed to obtain a green tire. Next, the green tire is subjected to heating vulcanization according to a conventional method. Thereby, a desired tire (e.g., a pneumatic tire) may be produced.

(Use for Other than Tire)

Other than the tire, the rubber composition or the crosslinked rubber composition described above may be used for antivibration rubber, base isolation rubber, belt (conveyor belt), rubber crawler, various types of hoses and the like.

EXAMPLES

Hereinafter, the present invention will be described in more detail by using examples. However, the present invention is not limited to the examples described below.

Example 1

Method of Producing Synthetic Polyisoprene A

Within a globe box under a nitrogen atmosphere, in a 1-litter pressure-tight glass reactor, 353 μmol of tris bistrimethylsilylamide gadolinium ($Gd[N(SiMe_3)_2]_3$) (component (A)), 3.53 mmol of tri-isobutyl aluminum (component (C)) and 20.0 g of toluene were prepared and aged for 30 minutes. Next, 353 μmol of triphenylcarbonium tetrakis(pentafluorophenyl) borate ($Ph_3CB(C_6F_5)_4$) (component (B)) and 472.0 g of cyclohexane were added and thus obtained mixture was further aged for 30 minutes. Then, the reactor was removed from the glove box, to which 120.0 g of isoprene was added for polymerization at room temperature for 12 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer A was obtained, and a yield thereof was 119.0 g.

Example 2

Method of Producing Synthetic Polyisoprene B

Other than using, as the component (A), tris bistrimethylsilylamide neodymium ($Nd[N(SiMe_3)_2]_3$) instead of the tris bistrimethylsilylamide gadolinium ($Gd[N(SiMe_3)_2]_3$), the polymerization was carried out in the same manner as Example 1. Thereby, a polymer B was obtained, and a yield thereof was 119.0 g.

Example 3

Method of Producing Synthetic Polyisoprene C

Within the globe box under the nitrogen atmosphere, in the 1-litter pressure-tight glass reactor, 5.9 μmol of tris bistrimethylsilylamide gadolinium ($Gd[N(SiMe_3)_2]_3$) (component (A)), 2.95 mmol of tri-isobutyl aluminum component ((C)) and 5.0 g of toluene were prepared and aged for 30 minutes. Next, 5.9 μmol of triphenylcarbonium tetrakis(pentafluorophenyl) borate ($Ph_3CB(C_6F_5)_4$) (component (B)) and 472.0 g of cyclohexane were added and thus obtained mixture was further aged for 30 minutes. Then, the reactor was removed from the glove box, to which 120.0 g of isoprene was added for polymerization at room temperature for 12 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer C was obtained. Thereby, a polymer C was obtained, and a yield thereof was 103.0 g.

Example 4

Method of Producing Synthetic Polyisoprene D

Within the globe box under the nitrogen atmosphere, in the 1-litter pressure-tight glass reactor, 5.9 μmol of tris bistrimethylsilylamide gadolinium ($Gd[N(SiMe_3)_2]_3$) ((A) component), 2.95 mmol of tri-isobutyl aluminum (component (C)), 5.9 μmol of bis(diphenylphosphynophenyl) amine (component (D)), and 5.0 g of toluene were prepared and aged for 30 minutes. Next, 5.9 μmol of triphenylcarbonium tetrakis(pentafluorophenyl) borate ($Ph_3CB(C_6F_5)_4$) (component (B)) and 472.0 g of cyclohexane were added and thus obtained mixture was further aged for 30 minutes. Then, the reactor was removed from the glove box, to which 120.0 g of isoprene was added for polymerization at room temperature for 5 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer D was obtained, and a yield thereof was 118.5 g.

Example 5

Method of Producing Synthetic Polyisoprene E

Other than using, as the component (A), tris bistrimethylsilylamide yttrium ($Y[N(SiMe_3)_2]_3$) instead of the tris bistrimethylsilylamide gadolinium ($Gd[N(SiMe_3)_2]_3$), the polymerization was carried out in the same manner as Example 4. Thereby, a polymer E was obtained, and a yield thereof was 120.0 g.

Comparative Example 1

Method of Producing Synthetic Polyisoprene X

Within the glove box under the nitrogen atmosphere, in a 100 ml pressure-tight glass bottle that was well dried, 0.05 mmol of dimethyl aluminum (μ-dimethyl) bis(pentamethylcyclopentadienyl) gadolinium [$(Cp^*)2Gd(\mu-Me)_2AlMe_2$] was prepared and dissolved in 34.0 ml of toluene. Next, 1.5 mmol of tri-isobutyl aluminum and 0.05 mmol of triphenylcarbonium tetrakis(pentafluorophenyl) borate ($Ph_3CB(C_6F_5)_4$) were added thereto and the bottle was capped. After reaction at room temperature for 1 hour, the bottle was removed from the glove box and 1.0 ml of isoprene was added thereto, which was then subjected to polymerization at −40° C. for 15 hours. After the polymerization, 10 mL of methanol solution containing 10 wt % of 2,6-bis(t-butyl)-4-methyl phenol was added to stop the reaction, and thus obtained polymer was separated by using a great amount of mixed solvent of methanol and hydrochloric acid and vacuum-dried at 60° C. Thereby, a polymer X was obtained, and a yield rate thereof was 100%.

Comparative Example 2

Method of Producing Synthetic Polyisoprene Y

Within the glove box, a magnetic stirrer was placed in a flask (100 mL), to which isoprene (2.04 g, 30.0 mmol) and chlorobenzene solution [Y(Ch$_2$C$_6$H$_4$NMe$_2$-O)$_2$(PNP)] (12.5 μmol) (16 mL) were added and, under fast stirring, chlorobenzene solution [PhMe$_2$NH][B(C$_6$F$_5$)$_4$] (12.5 μmol) (4 mL) was added thereto. After the stirring at room temperature for 5 minutes to allow reaction, methanol was added thereto to stop the polymerization. Thus obtained reaction solution was poured into 200 mL of methanol solution containing a small amount of hydrochloric acid and butyl hydroxy toluene (stabilizer). Polymer product precipitated by decantation was separated, washed in methanol, and then dried at 60° C. Thereby, a polymer Y was obtained (the yield rate: 100%).

Comparative Example 3

Method of Producing Synthetic Polyisoprene Z

Polymerization was carried out under the same conditions as Test C as described in Patent Document 3, and thus a polymer Z was obtained.

(1) Microstructure (Cis-1,4 Bond Content)

Each of the synthetic polyisoprene A to E and X to Z was calculated from integral proportions of peaks [$^1$H-NMR: δ4.6-4.8 (=CH$_2$ of 3,4-vinyl unit), 5.0-5.2 (—CH= of 1,4-unit), $^{13}$C-NMR: [δ23.4 (1,4-cis unit), 15.9 (1,4-transformer unit), and 18.6 (3,4-unit)] obtained by $^1$H-NMR and $^{13}$C-NMR. Also, the number average molecular weight (Mn) and a molecular weight distribution (Mw/Mn) were determined by using polystyrene as a standard substance by using a GPC.

(2) Weight Average Molecular Weight (Mw), Number Average Molecular Weight (Mn), and Molecular Weight Distribution (Mw/Mn)

For the synthetic polyisoprene A to E and X to Z, by using a gel permeation chromatography [GPC: HLC-8220GPC manufactured by Tosoh Corporation, column: 2 GMH$_{XL}$ manufactured by Tosoh Corporation, Detector: a differential refractometer (RI)], on the basis of monodisperse polystyrene, the weight average molecular weight (Mw), the number average molecular weight (Mn), and the molecular weight distribution (Mw/Mn) of polystyrene equivalent of the synthetic polyisoprene were determined. Note that the measurement temperature was 40° C. THF was used as an elution solvent.

(3) Rare Earth Element Content of Polymer (Ppm)

For each of the synthetic polyisoprene A to E and X to Z, by using a wavelength dispersive fluorescence X-ray apparatus [XRF-1700 manufactured by Shimadzu Corporation] on the basis of the polyisoprene with known rare earth element content, rare earth element content (ppm) of the synthetic polyisoprene was determined. Note that Rh was used as an X-ray source, and the measurement was carried out under vacuum.

TABLE 1

|  |  | Example 1 Polymer A | Example 2 Polymer B | Example 3 Polymer C | Example 4 Polymer D | Example 5 Polymer E |
|---|---|---|---|---|---|---|
| Polymerization solvent |  | Toluene | Toluene | Cyclohexane | Cyclohexane | Cyclohexane |
| Molar ratio | Isoprene/component (A) | 5,000 | 5,000 | 300,000 | 300,000 | 300,000 |
|  | Component (C)/component (A) | 10 | 10 | 500 | 500 | 500 |
|  | Isoprene/component (C) | 500 | 500 | 600 | 600 | 600 |
|  | Activation (kg/mol · h) | 30 | 30 | 1,450 | 4,020 | 3,800 |
|  | Mw (×10$^3$) | 2,320 | 2,487 | 1,884 | 2,038 | 2,622 |
|  | Mn (×10$^3$) | 725 | 721 | 652 | 775 | 950 |
|  | Mw/Mn | 3.20 | 3.45 | 2.89 | 2.63 | 2.76 |
|  | Cis-1,4 bond content (%) | 95.2 | 97.6 | 98.2 | 98.4 | 98.2 |
|  | Rare earth element content of polymer (ppm) | 570 | 550 | 12 | 10 | 20 |

TABLE 2

|  |  | Comparative example 1 Polymer X | Comparative example 2 Polymer Y | Comparative example 3 Polymer Z |
|---|---|---|---|---|
| Polymerization solvent |  | Toluene | Chlorobenzene | Cyclohexane |
| Molar ratio | Isoprene/component (A) | 200 | 2,400 | 4,900 |
|  | Component (C)/component (A) | 30 | 0 | 4 |
|  | Isoprene/component (C) | 6.7 | — | 1,225 |
|  | Activation (kg/mol · h) | 0.9 | 820 | 5 |
|  | Mw(×10$^3$) | 2,135 | 553 | 2,452 |
|  | Mn(×10$^3$) | 1,220 | 410 | 958 |
|  | Mw/Mn | 1.75 | 1.35 | 2.56 |
|  | Cis-1,4 bond content (%) | 99.6 | 98.5 | 98.4 |
|  | Rare earth element content of polymer (ppm) | >10,000 | >1,000 | 620 |

As shown in Table 1, by using a polymerization catalyst composition containing the component (A), the component (B), and component (C), polymerization of isoprene monomer was carried out such that a combining molar ratio satisfies: (isoprene monomer)/(component (A)) is at least 5,000, (component (C))/(component (A)) is at least 10, and (isoprene monomer)/(component (C)) is no more than 5000. Thereby, high molecular weight polybutadiene with high cis-1,4 bond content was obtained.

INDUSTRIAL APPLICABILITY

The synthetic polyisoprene produced by the method of the present invention and rubber composition containing the synthetic polyisoprene may be preferably used for, for example, a tire material (in particular, a tread member).

The invention claimed is:

1. A polymerization catalyst composition containing:
   a rare earth element compound (component (A)) represented by the following general formula (i):

$$M\text{-}(NQ^1)(NQ^2)(NQ^3) \qquad (i)$$

(provided that M is at least one selected from the group consisting of lanthanide, scandium, and yttrium; and $NQ^1$, $NQ^2$, and $NQ^3$ are of amide group and may be either the same or different from one another and have M-N binding);
   at least one (component (B)) selected from an ionic compound and a halogen compound;
   a compound (component (C)) represented by the following general formula (X):

$$YR^1{}_a R^2{}_b R^3{}_c \qquad (X)$$

(provided that Y is metal selected from the group consisting of Group 1, Group 2, Group 12, and Group 13 of the periodic table; $R^1$ and $R^2$ are of a hydrocarbon group having 1 to 10 carbon atoms or a hydrogen atom; $R^3$ is of the hydrocarbon group having 1 to 10 carbon atoms; $R^1$, $R^2$, and $R^3$ may be the same or different from one another; when Y is metal selected from Group 1 of the periodic table, a is 1 and b and c are 0; when Y is metal selected from Group 2 or Group 12 of the periodic table, a and b are 1 and c is 0; and when Y is metal selected from Group 13 of the periodic table, a, b, and c are all 1); and
   a coumpound serving as an anionic ligand (component (D)) being an anionic tridentate ligand precursor.

2. A method of producing synthetic polyisoprene including polymerization of isoprene monomer in the presence of a polymerization catalyst composition containing:
   a rare earth element compound (component (A)) represented by the following general formula (i):

$$M\text{-}(NQ^1)(NQ^2)(NQ^3) \qquad (i)$$

(provided that M is at least one selected from the group consisting of lanthanide, scandium, and yttrium; and $NQ^1$, $NQ^2$, and $NQ^3$ are of amide group and may be either the same or different from one another and have M-N binding);
   at least one (component (B)) selected from an ionic compound and a halogen compound; and
   a compound (component (C)) represented by the following general formula (X):

$$YR^1{}_a R^2{}_b R^3{}_c \qquad (X)$$

(provided that Y is metal selected from the group consisting of Group 1, Group 2, Group 12, and Group 13 of the periodic table; $R^1$ and $R^2$ are of a hydrocarbon group having 1 to 10 carbon atoms or a hydrogen atom; $R^3$ is of the hydrocarbon group having 1 to 10 carbon atoms; $R^1$, $R^2$, and $R^3$ may be the same or different from one another; when Y is metal selected from Group 1 of the periodic table, a is 1 and b and c are 0; when Y is metal selected from Group 2 or Group 12 of the periodic table, a and b are 1 and c is 0; and when Y is metal selected from Group 13 of the periodic table, a, b, and C are all 1);
   wherein the polymerization catalyst is further mixed with a compound serving as an anionic ligand (component (D)) being an anionic tridentate ligand precursor.

3. The method of producing synthetic polyisoprene according to claim 2, wherein a combining molar ratio of the isoprene monomer, the component (A), and the component (C) satisfies:
   (isoprene monomer)/(component (A)) is at least 5000,
   (component (C)/(component (A)) is at least 10, and
   (isoprene monomer)/(component (C)) is no more than 5000.

4. The method of producing synthetic polyisoprene according to claim 2, wherein the component (D) includes at least one functional group selected from the group consisting of an OH group, an SH group, and an NH group.

5. The synthetic polyisoprene produced by the method according to claim 2, wherein cis-1,4 bond content is at least 95%.

* * * * *